UNITED STATES PATENT OFFICE.

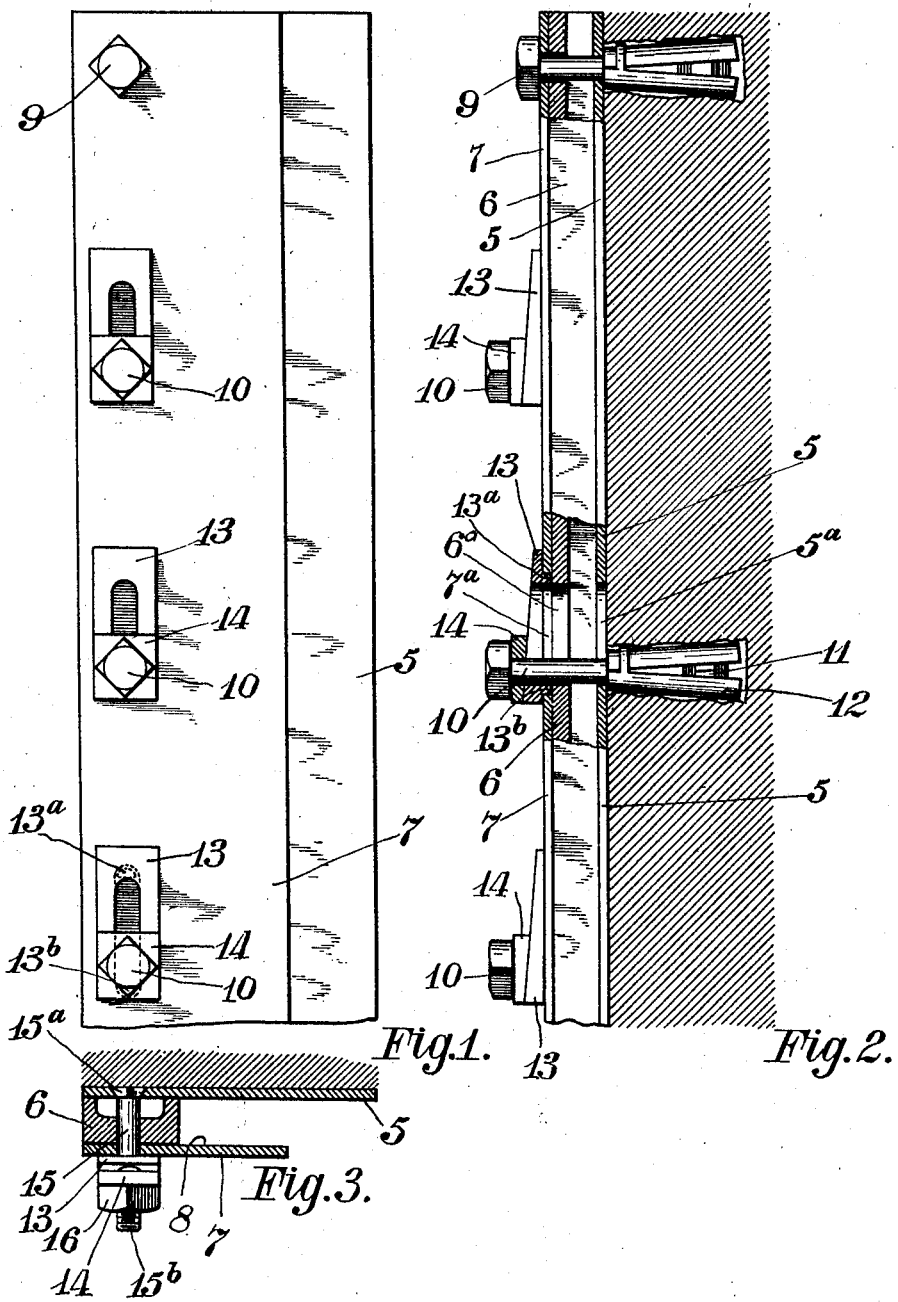

EDWARD H. McCLOUD, OF COLUMBUS, OHIO, ASSIGNOR TO THE KINNEAR MANUFACTURING COMPANY, OF COLUMBUS, OHIO, A CORPORATION OF OHIO.

MEANS FOR RELEASING THE FASTENINGS OF METALLIC PARTS IN CASE OF FIRE.

1,332,946.         Specification of Letters Patent.       Patented Mar. 9, 1920.

Application filed June 29, 1918. Serial No. 242,608.

*To all whom it may concern:*

Be it known that I, EDWARD H. MCCLOUD, a citizen of the United States, residing at Columbus, in the county of Franklin and State of Ohio, have invented a certain new and useful Improvement in Means for Releasing the Fastenings of Metallic Parts in Case of Fire, of which the following is a specification.

The object of this invention is to provide improved means for securing a metallic member as for example a metallic bar to another part so that when such metallic part is subjected to a temperature adapted to otherwise buckle or flex it such metallic part shall be permitted to expand notwithstanding the securing devices. For example the channels for sliding fire shutters are frequently made up of two or more metallic bars bolted together.

In putting up such channels great care was necessary to avoid turning up the nuts or bolts so tightly as to prevent the desired slipping of the bars, and in my practice I found that workmen could not be relied upon to leave the bolts sufficiently loose to permit the proper expansion and maintain the straightness of the bars when they were acted upon by undue heat. I have previously devised one means of accomplishing this. My present invention aims to provide another form of means for permitting the bar or bars to expand when subjected to such heat and is embodied in the construction herein shown and described and then pointed out in the claims.

In the accompanying drawings—

Figure 1 is a view in front elevation of a fraction of a fire shutter channel equipped with the improvement.

Fig. 2 is an edge view of the same looking toward the open side of the channel with parts in section to illustrate details of construction.

Fig. 3 is a horizontal section through the channel showing incidentally a modification.

In the views the channel is shown as composed of three metallic members towit: a wide plate-like bar 5 to fit against the wall, a spacer member 6 and a narrow bar 7. The three parts when bolted together as shown form a groove 8 in which one edge of the fire shutter travels when raised and lowered as well understood by those skilled in the art.

The bars and spacer member are usually secured fixedly together at their upper ends to the wall by means of a bolt at 9 passed through alined round holes in the channel members of the same diameter at the shank of the bolt so that when the bars are subjected to undue heat they expand downward and perhaps at different rates according to circumstances. At one or more points below the bolt 9 the channel members are secured together by means of bolts 10 (referring more particularly to Figs. 1 and 2) that are passed through slots $5^a$, $6^a$ and $7^a$ extending longitudinally in the channel members 5, 6 and 7 respectively and into the nut 11 of an expanded shell 12 set in a hole in the wall. But between the head of the bolt 10 and the outer channel member 7 two wedge shaped blocks 13 and 14 are placed upon each other so that their opposite faces are substantially parallel with the plane of the junction between them inclining upward toward the channel. The block 13 next the channel member 7 is provided with lugs $13^a$ and $13^b$ (see full lines Fig. 2 and broken lines Fig. 1) engaging the channel at the upper and lower ends of the slot of said channel member. When the blocks have been placed in the position described the bolt is turned up sufficiently tight to hold the channel members in their proper position. It will be observed, therefore, that when the channel is subjected to undue heat, as for example of a nearby fire, sufficient to cause much expansion of its members the inner wedge block 13 is carried down, separating it from the block 14 and leaving all the channel members free to expand longitudinally and independently of each other. This freedom for expansion prevents the buckling of the channel and the formation of spaces for the passage of fire as well as other possible undesirable consequences.

Instead of a bolt of the kind shown in Fig. 2 there can be employed a bolt 15 such as shown in Fig. 3 which has a non-rounded head $15^a$ at its inner end where it engages a similar countersink in the inner channel member 5 the threaded shank $15^b$ of said bolt being exposed through the outer channel member 7 to receive a binding nut 16. Where this last described construction is employed, however, it is desirable that the channel members be secured to the wall at other points by some such means as shown in Fig. 2.

With this construction it is obvious that the necessity for the exercise of great care on the part of the workmen who turn up the bolts or nuts is not required, it sufficing that the bolts or nuts be turned up tight enough to secure the wedge blocks in proper position and the channel members together.

The subject of this patent was first shown and described in applications Serial No. 720,167, filed September 13, 1912, and Serial No. 793,482, filed Oct. 4, 1913, which applications became forfeited and abandoned.

What I claim is:

1. In means of the kind described, the combination of two parts, one of which is a metallic bar subjected to longitudinal expansion by heat, means rigidly connecting the two parts at one point, said bar being provided at another point with a hole for the passage of a bolt sufficiently large to permit longitudinal expansion of the bar transversely of the bolt, a bolt connecting said parts through said hole and means associated with the bolt and bar for normally restraining their movement transversely with reference to each other, said means releasable by the bar when the latter is longitudinally expanded.

2. In means of the kind described, the combination of two parts, one of which is a metallic bar subjected to longitudinal expansion by heat, means rigidly connecting the two parts at one point, said bar being provided at another point with a hole for the passage of a bolt sufficiently large to permit longitudinal expansion of the bar transversely of the bolt, a bolt connecting said parts through said hole, and means associated with the bolt and bar for normally restraining their movement transversely with reference to each other, said means including a wedge shaped member releasable by the bar when the latter is longitudinally expanded.

3. In means of the kind described, the combination of two parts, one of which is a metallic bar subjected to longitudinal expansion by heat, means rigidly connecting the two parts at one point, said bar being provided at another point with a hole for the passage of a bolt sufficiently large to permit longitudinal expansion of the bar transversely of the bolt, a bolt connecting said parts through said hole, and means associated with the bolt and bar for normally restraining their movement with reference to each other, said means including a wedge shaped member having a lug engagement between it and the bar, said wedge shaped member releasable by the bar when the latter is longitudinally expanded.

4. In means of the kind described, the combination of two parts, one of which is a metallic bar subjected to longitudinal expansion by heat, means rigidly connecting the two parts at one point, said bar being provided at another point with a hole for the passage of a bolt sufficiently large to permit longitudinal expansion of the bar transversely of the bolt, a bolt connecting said parts through said hole, and means associated with the bolt and bar for normally restraining their movement with reference to each other, said means including two wedge shaped members reversely placed on each other and releasable by the bar when the latter is longitudinally expanded.

5. In means of the kind described, the combination of two parts, one of which is a metallic bar, means rigidly connecting the two parts at one point, means connecting said parts at other points, means for releasing said last named connecting means upon the expansion of said bar.

EDWARD H. McCLOUD.